United States Patent Office 2,783,148
Patented Feb. 26, 1957

2,783,148

ALCOHOLIZED CHITIN, PROCESS OF PREPARATION AND FOOD PRODUCTS CONTAINING THE SAME

Paul György, Villanova, Pa., and Richard Kuhn and Friedrich Zilliken, Heidelberg, Germany, assignors, by mesne assignments, to American Home Products Corporation, New York, N. Y., a corporation of Delaware No Drawing. Application May 27, 1952,
Serial No. 290,325

12 Claims. (Cl. 99—54)

This invention relates to food products and, more particularly, to food products which are suitable for use in the feeding of infants.

Our invention is more especially concerned with certain new and improved food compositions which contain the usual fat, protein, carbohydrate, fatty acid, amino acid, vitamin and mineral constituents necessary for growth of the infant, but which compositions also contain, in addition, a specific factor or principle necessary to support the growth of the microorganism Lactobacillus bifidus as the predominant microorganism in the digestive tract of the infant fed therewith.

Our invention also relates to the preparation of new substances which are biologically active and which have high activity for promoting the growth of the microorganism Lactobacillus bifidus, and especially for promoting the growth of those strains of the microorganism, such as L. bifidus var. Penn., which do not normally grow unless specific growth-promoting principles are present and available to the microorganism.

There are a number of commercially available food compositions utilized for the feeding of infants which are based on cow's milk as an essential and important nutritive constituent thereof. These compositions generally contain, in addition to added vitamins, a fat constituent, milk protein, an edible sugar (frequently lactose), minerals, and ash. The relative proportion of these constituents is such as to provide a nutritive formula meeting all the nutritional requirements of the infant when an aqueous solution of a specified concentration is prepared and fed to the infant.

As an example, one well-known commercially available infant feeding formula, derived from cow's milk but having major physical and chemical properties essentially the same as human milk, contains approximately 1.5% of protein, 7.0% of carbohydrate, 3.5% of fat, 0.38% of ash and a mineral constituent, such as iron, present in a relatively minor amount as, for example, approximately 0.0005%, as the food is made up as a liquid ready to feed to the infant. Such a composition is, in many respects, similar to human milk, will supply approximately 20 calories per fluid ounce and contains of course, in addition, various vitamin constituents, such as vitamin A, thiamin, riboflavin, vitamin C, vitamin D and niacin, all present (with the exception of vitamin C) in amounts considerably in excess of the amounts in which those vitamins are present in an equal volume of human or breast milk.

It should be understood, of course, that the particular commercial food composition having the foregoing analysis is but one of many available infant feeding formulas, all based on, or derived from, cow's milk, which compositions are usually supplied, either in a concentrated liquid form which is adapted to be diluted with water before use, or as a solid powder or granular composition which is dissolved in water in specified proportions to provide solutions of specified concentrations. Such compositions will vary to some extent from each other in the ingredients utilized, i. e. the source of the fat present therein, the content of saturated and unsaturated fatty acids and amino acids, the carbohydrate constituents, the relative proportions of the ingredients, etc., but they are essentially similar in that all are derived from the milk of cows. While some of these commercially available infant food compositions are similar in their major physical and chemical properties and in greater or less degree to human or breast milk as supplied to a nursling by the lactating mother, there are certain important differences in the predominating microorganisms present in the intestinal bacterial flora characteristic of an infant fed exclusively on human or breast milk, as compared with the intestinal flora of an infant fed with one of the commercial food formulas based on, or derived from, cow's milk.

The intestinal flora of the breast fed infant is characterized by the presence therein of the microorganism Lactobacillus bifidus as the predominating microorganism. The stools of infants fed exclusively with human milk are in fact characterized by the presence of this microorganism as constituting almost the entire bacterial flora therein.

As seen in smears when freshly isolated from the infant feces, the L. bifidus organism comprises gram-positive, straight or curved rods that are non-motile and that do not form spores. One or both ends may appear to be split longitudinally to give the effect of two short branches, this appearance leading to the term "bifid." One end of the organism may be bulbous or racket-shaped.

While this microorganism predominates in the intestinal tract and feces of infants fed with human or mother's milk, it is not the characteristic or predominating microorganism in the intestinal tract of infants fed with other foods, such as cow's milk or with the commercially available food preparations derived from, or based on, cow's milk. Infants so fed show a less uniform intestinal flora with an appreciable proportion of gram-negative rods and cocci.

The fact that a stable L. bifidus flora is characteristic only of the intestinal tract of breast-fed infants is now fully understood and appreciated by pediatricians and other specialists in the medical, biological, and nutritional sciences. See, for example, the publications of Tissier, Comptes rendus soc. biol., 51, pages 943–945; and 60, pages 359, 361; and Ann. inst. Pasteur, 19, pages 109–123; and 22, pages 189–207. See also the papers of Moro: Wien. klin. Wochschr., 13, pages 114–115, and Jahrb. Kinderheilk., 61, pages 676–734; and 61, pages 870–899. That the original observations of Tissier concerning the predominance of L. bifidus in nurslings' stool have been amply confirmed is pointed out in the more recent publication of Norris, Flanders, Tomarelli, and György in the Journal of Bacteriology, 60, pages 681–696 (December 1950).

Medical authorities are now in general agreement that many of the advantages which a breast-fed infant seems to have, insofar as its nutrition and resistance to certain diseases are concerned, are attributable, at least in part, to the predominance of L. bifidus in his intestinal tract. The prevalence of this organism in the intestinal tract is now believed to be of physiological significance, and its growth may prevent intestinal disorders caused by other bacteria. Resistance to bacterial intestinal diseases, and even to parenteral disorders, such as respiratory infections, is typical of breast-fed infants. Infants who are bottle-fed with the milk of cows and other animals, or with infant feeding formulas utilizing cow's milk as the source of protein, are definitely more susceptible to such disorders. In this connection see the article of Robinson in Lancet, entitled: Infant morbidity and mortality, vol. CCLX, page 788 (April 7, 1951).

In the infant colon in which a stable L. bifidus flora is lacking, it is now generally believed that the infant is more likely to suffer from disorders attributable to the growth of other bacteria some of which are harmful to the infant, since competition for the available food supply in the infant intestinal tract where L. bifidus fluorishes reduces the possibility that other bacteria, particularly the harmful B. coli, may grow in considerable numbers or in extensive colonies.

In any event, where the gram-positive bacillus L. bifidus is present in large numbers in the infant intestine, which is now found only when the infant is breast-fed, there is considerably less growth of other microorganisms, particularly of the gram-negative B. coli, the Clostridia, and of certain air-born microorganisms such as the Sarcinae bacteria. While the reasons for the superior resistance to disease of breast-fed infants as compared with infants who are fed on cow's milk, or on the usual infant formulas in which cow's milk is a principal constituent, are not fully understood pediatricians are generally agreed that in some measure, at least, the superior resistance is attributable to the presence of an extensive L. bifidus flora in the intestines of nurslings, this bacterium being absent in any considerable numbers from the intestines of infants who are not fed with human milk. Interest in the isolation and determination of the growth requirements of L. bifidus and, in particular, of the growth-promoting principles which are essential for the growth of such strains as L. bifidus var. Penn. which will not satisfactorily grow without these principles, has therefore been stimulated by its apparently unique predominance in the intestinal tract of the breast-fed infant.

Extensive work has been carried out on the identification and isolation of the active biological principle which is responsible for promoting the growth of L. bifidus in the intestines of infants who are nourished with human milk, which active principle is evidently not present in sufficient amount to insure the growth of L. bifidus as the predominant microorganism in the intestinal tract of infants who are fed with cow's milk, or with any of the usual feeding compositions or infant formulas based on cow's milk. This work has demonstrated that the growth promoting factor is also present in cow's milk as well as in human milk, but it is present in cow's milk in such small amounts as to be insufficient to supply to infants fed with cow's milk enough of the growth-promoting factor for L. bifidus to cause that organism to predominate in the intestinal bacterial flora of the infant.

While the concentration of the growth-promoting factor for L. bifidus in cow's milk varies to some extent with various samples of milk, and to some extent with the particular strain or variety of the L. bifidus microorganism which is selected for the test, ordinarily the growth-promoting factor is present in cow's milk only in about 1/30 the concentration (approximately 3.33%) in which it is present in human or breast milk. In this concentration it is evidently present in too small an amount to insure that L. bifidus will be the predominating microorganism in the intestinal flora of infants fed with cow's milk. It should be noted that only about one-half of the solid content of the commercial infant food preparation of which the analysis is given above is cow's milk, and the L. bifidus growth-promoting factor is present in such an infant food formula only to the extent of approximately 1/60 (approximately 1.67%) of the amount in which it is present in an equal volume of human milk.

While the advantages of supplying the feeding infant with a food composition suitable for promoting the growth of L. bifidus as the predominating microorganism in the infant colon have been appreciated for some time, it has not been possible to attain this with any of the presently available food compositions wherein the growth-promoting factor, on an average, has been present only to the extent of approximately 1.67% of the amount in which it is present in human milk as compared on an equal volume basis. From time to time thought has been directed to the possibility of adding to infant food compositions some material or substance which would supply the L. bifidus growth-promoting factor in greater amount, so that this growth-promoting factor could be present in the infant's nourishment to an extent sufficient to insure the predominance of the microorganism L. bifidus in his intestinal tract. Unfortunately, however, until comparatively very recently, no substance other than human milk has been known to contain the growth-promoting factor in sufficiently high concentration to permit the enhancement of the growth-promoting factor content to an extent adequate to insure this result with the presently available commercial preparations, and human milk is not of course a practical additive to such formulas.

We have now discovered that the growth-promoting factor necessary to support the growth of Lactobacillus bifidus in the intestinal tracts of infants and other persons, and more particularly, essential to support the growth of those strains of L. bifidus, such as L. bifidus var. Penn. (which are known to grow only in the presence of the growth-promoting factor, until very recently known to exist solely in human milk, is also present in a product which is very easily prepared from chitin. Not only is this material as prepared from chitin effective in promoting the growth of L. bifidus, and especially the growth of strains such as L. bifidus var. Penn., but our new material, alcoholized chitin, is a very potent source of this essential growth-promoting factor. Our new substance may therefore be incorporated in various food preparations and in compositions possessing therapeutic activity as an ingredient therein, thus promoting the growth of Lactobacillus bifidus in the intestinal tracts of those persons ingesting these preparations or compositions.

Our new growth-promoting substances, capable of promoting the growth of the microorganism Lactobacillus bifidus, are easily prepared by utilizing chitin as a starting material. Chitin is available from various sources, among which are the shells of crustaceans, including lobsters, shrimp and crabs, and the hard cases of various insects such as beetles. It is also present to some extent in fungi and other vegetable sources. Chitin in substantially pure form may be readily prepared from such naturally occurring products by various convenient methods. For example, lobster shell, or other crustacean or insect source, may first be treated, preferably for one or two days, with a caustic solution, such as with a ten percent solution of sodium hydroxide. The resulting material is then subjected to the action of a mineral acid, such as hydrochloric acid of about five percent concentration, preferably for a period of one or two days, at the end of which a skeletonized product is secured which is practically pure chitin. Other mineral acids can of course be used in preparing the chitin, and chitin from any source may be utilized as the starting material from which we prepare our new products possessing high activity as growth-promoting agents for Lactobacillus bifidus, including those strains such as L. bifidus var. Penn. which require the presence of the growth-promoting agent in order that they may grow at all.

In preparing alcoholized chitin, chitin as obtained from any source is suspended in an alcohol, such as methanol, ethanol, isopropanol, etc. The suspension is then treated with an anhydrous acid, preferably by saturating it at a relatively low temperature with dry hydrogen chloride gas. After a period of time substantially all the chitin is dissolved. The clear solution is then evaporated to dryness under reduced pressure, and the residue is taken up in a small amount of the particular alcohol used, treated with decolorizing carbon, and again evaporated to dryness. The resulting material may, if desired, be further purified by the procedure described in our copending patent application Ser.

No. 283,773, filed April 22, 1952, (now Patent No. 2,694,640, issued November 16, 1954). The resulting product is alcoholized chitin possessing high activity for promoting the growth of *Lactobacillus bifidus*, including the *L. bifidus* var. Penn. strain thereof.

As an example of our improved process of preparing alcoholized chitin, and of the improved products thereby obtained, the following example is illustrated of the preparation of methanolized chitin.

The chitin is suspended in methanol, using approximately two to three liters of substantially anhydrous methanol per 200 grams of chitin treated. The suspension is kept at room temperature or at 0° C., and saturated with hydrogen chloride gas. Practically all of the chitin is dissolved at the end of about two hours. The solution was then evaporated to dryness under reduced pressure, the dry residue taken up in a small amount of methanol, treated with decolorizing charcoal, and the solution again evaporated to dryness.

The resulting product, methanolized chitin, is a white powder which is readily soluble in water. Its optical rotation is:

$$[\alpha]_D^{25} = +20° \pm 10° \text{ (in water)}$$

The product does not reduce Fehling's solution and does not give a positive reaction when treated with ninhydrin. Its growth-promoting activity for *Lactobacillus bifidus* var. Penn. is 200 micrograms/E. It is therefore about fifteen times as active as N-acetyl-d-glucosamine (2-desoxy-2-acetamino-d-glucose).

It may be noted that the growth-promoting activity of a material, which is a measure of its ability to promote the growth of *Lactobacillus bifidus* strains, is expressed as the weight of the material necessary to give a standard growth response, E, this unit, E, being the growth response given by approximately 0.06 milliliters of human or breast milk of average growth-promoting activity. (The growth-promoting activity of breast milk varies to some extent, and the value, E, is based on average condition.) The lower the micrograms per E for a given material, the higher is its growth-promoting activity for *L. bifidus*.

Ethanolized chitin can be similarly prepared, by reacting chitin with ethanol at a relatively low temperature by a similar procedure.

We have found that the amount of an alcoholized chitin, such as methanolized chitin, which should be incorporated in an infant feeding formula or therapeutic composition either for infants or old persons, or for persons of any age, where the formula or composition is based on or derived from cow's milk and is of the general type previously described, may range from about 0.5% to 5.0% by weight, this percentage being based on the total weight of solids present in the infant feeding formula or therapeutic composition. Frequently an amount of alcoholized chitin not exceeding about 1.0% will be found satisfactory for many purposes in infant feeding and in therapeutic compositions.

The addition of an alcoholized chitin, such as methanolized chitin, or ethanolized chitin, to such a composition in amounts within the range 0.5% to 5% by weight thereof, based on the solids content of the composition, supplements the small amount of *L. bifidus* growth-promoting factor or factors already present in that composition as a result of the cow's milk content thereof so that the quantity of growth-promoting principle, as supplemented, is approximately comparable with or greater than the amount occurring, on the average, in an equal volume of human (breast) milk. When infants or aged persons are fed with this composition or formula, the protein content thereof being derived from cow's milk and the content of growth-promoting factor or factors supplemented by the addition of alcoholized chitin thereto, all strains of the *L. bifidus* microorganisms, including *L. bifidus* var. Penn., will grow in the intestinal tracts of persons fed therewith, since the composition provides a source of nutriment which is, as respects the amount of *L. bifidus* growth principle present therein, substantially equal to human milk or superior thereto. The *L. bifidus* microorganism is thus able to grow and proliferate to the same extent that it would if the infant or aged person were fed with human milk.

While we prefer to add to food compositions based on cow's milk as utilized for infant feeding or in geriatrics amounts of alcoholized chitin, such as methanolized chitin or ethanolized chitin, ranging from approximately 0.5% to 5% by weight, based on the solids content of the composition, the quantity that need be added to secure satisfactory supplementation of the *L. bifidus* growth-promoting factor is not unduly critical and may be varied within wide limits. The amount of added alcoholized chitin may therefore, depending on requirements, vary by considerable percentages. Also, of course, it is possible to utilize infant food compositions, and compositions possessing health value or therapeutic activity for persons who are not infants, which contain less than that concentration of growth-promoting factor which is present in human milk. In such cases the amount of alcoholized chitin added may be somewhat less than the minimum percentage given as the lower limit of the illustrative range specified.

While we have specifically mentioned our improved food compositions as being of value in infant feeding, or in geriatrics, our compositions are of general value, both for human consumption and for feeding animals. Infant food compositions have been described as illustrative, but alcoholized chitin might also be included as an ingredient in animal feeds, more particularly in various animal foodstuffs intended for ingestion by young animals, such as synthetic pigs' milk or bitches' milk. Accordingly, in the appended claims, the compositions valuable for food purposes are to be construed as covering food compositions intended both for human consumption and for animal consumption.

Various modifications of this invention will be apparent to those skilled in the art, and to the extent that these modifications are within the scope of the appended claims they are to be considered as part of our invention.

We claim:

1. The process which comprises reacting chitin with an anhydrous alcohol selected from the group consisting of anhydrous methanol, anhydrous ethanol and anhydrous isopropanol, said reaction being carried out at a temperature within the range 0° C. to room temperature and in the presence of anhydrous hydrogen chloride gas.

2. The process which comprises reacting chitin with anhydrous methanol in the presence of anhydrous hydrogen chloride gas at a temperature of approximately 0° C.

3. The process which comprises reacting chitin with substantially anhydrous methanol in the presence of anhydrous hydrogen chloride gas at a temperature within the range 0° C. to room temperature.

4. An alcoholized chitin prepared by reacting chitin with an anhydrous alcohol selected from the group which consists of anhydrous methanol, anhydrous ethanol and anhydrous isopropanol, said reaction being carried out at a temperature within the range 0° C. to room temperature and in the presence of anhydrous hydrogen chloride gas.

5. A methanolized chitin prepared by reacting chitin with anhydrous methanol in the presence of anhydrous hydrogen chloride gas at a temperature within the range 0° C. to room temperature, said product having an optical rotation of $$[\alpha]_D^{25} = +20° \pm 10° \text{ (in water)}$$

6. An ethanolized chitin prepared by reacting chitin with anhydrous ethanol in the presence of anhydrous hydrogen chloride gas at a temperature within the range 0° C. to room temperature.

7. An isopropanolized chitin prepared by reacting chitin with anhydrous isopropanol in the presence of anhydrous hydrogen chloride gas at a temperature within the range 0° C. to room temperature.

8. A composition comprising cow's milk solids and an alcoholized chitin prepared by reacting chitin with an anhydrous alcohol selected from the group which consists of anhydrous methanol, anhydrous ethanol and anhydrous isopropanol, said reaction being carried out at a temperature within the range 0° C. to room temperature in the presence of anhydrous hydrogen chloride gas.

9. A composition comprising cow's milk solids and a methanolized chitin having an optical rotation of $$[\alpha]_D^{25} = +20° \pm 10°$$ (in water)

said methanolized chitin having been prepared by reacting chitin and anhydrous methanol in the presence of anhydrous hydrogen chloride gas at a temperature within the range 0° C. to room temperature.

10. A composition comprising cow's milk solids and an ethanolized chitin, said ethanolized chitin having been prepared by reacting chitin with anhydrous ethanol in the presence of anhydrous hydrogen chloride gas at a temperature within the range 0° C. to room temperature.

11. A composition comprising cow's milk solids and an isopropanolized chitin, said isopropanolized chitin having been prepared by reacting chitin with anhydrous isopropanol in the presence of anhydrous hydrogen chloride gas at a temperature within the range 0° C. to room temperature.

12. A nutritive composition comprising cow's milk solids and from 0.5 percent to 5 percent by weight of an alcoholized chitin selected from the group which consists of methanolized chitin, ethanolized chitin and isopropanolized chitin, said alcoholized chitin having been prepared by reacting chitin with an anhydrous alcohol selected from the group which consists of anhydrous methanol, anhydrous ethanol and anhydrous isopropanol at a temperature within the range 0° C. to room temperature in the presence of anhydrous hydrogen chloride gas.

References Cited in the file of this patent

UNITED STATES PATENTS

| | | |
|---|---|---|
| 2,040,880 | Rigby | May 19, 1936 |
| 2,072,771 | Rigby | Mar. 2, 1937 |
| 2,258,171 | Barry | Oct. 7, 1941 |
| 2,442,452 | Alderton et al. | June 1, 1948 |
| 2,463,885 | Kuehl et al. | Mar. 8, 1949 |
| 2,538,106 | Kuehl | Jan. 16, 1951 |
| 2,590,121 | Polo et al. | Mar. 25, 1952 |

OTHER REFERENCES

Article, "The Role of Lyzozyme in the Development of the Intestinal Flora of the New Born Infant," by L. Rosenthal and H. Lieberman, Reprinted from The Journal Of Infectious Diseases, vol. 48, No. 2; February 1931, pages 226–235 (Reprint pages 1 to 10).

"Methylation of Glucosamine," by W. O. Cutler et al., Journ. Chem. Soc., December 1937, pages 1979 to 1983.

Neuberger: Chem. Abstracts, 35, 3978 (1941).

"Chemistry of the Carbohydrates," by W. W. Pigman and R. M. Goepp, Jr., pub. 1948 by the Academic Press Inc., New York, N. Y., pages 412, 419.